United States Patent [19]

Patterson

[11] Patent Number: 4,865,412
[45] Date of Patent: Sep. 12, 1989

[54] CONNECTOR FOR SPLICING OPTICAL FIBER CABLES

[75] Inventor: Richard A. Patterson, Georgetown, Tex.

[73] Assignee: Minnesota Mining and Manufacturing Company, St. Paul, Minn.

[21] Appl. No.: 182,975

[22] Filed: Apr. 18, 1988

[51] Int. Cl.$^4$ ............................ G02B 6/38; G02B 6/36
[52] U.S. Cl. ............................. 350/96.21; 350/96.20; 350/96.22
[58] Field of Search ............... 350/96.15, 96.16, 96.20, 350/96.21, 96.22, 96.23

[56] References Cited

U.S. PATENT DOCUMENTS

| | | | |
|---|---|---|---|
| 4,029,390 | 6/1978 | Chinnock et al. | 350/96.21 X |
| 4,077,702 | 3/1978 | Kunze et al. | 350/96.21 |
| 4,123,138 | 10/1978 | Morrison | 350/96.21 |
| 4,181,401 | 1/1980 | Jensen | 350/96.21 |
| 4,205,898 | 6/1980 | Matthews | 350/96.21 |
| 4,211,470 | 7/1980 | Stewart | 350/96.21 |
| 4,220,397 | 9/1980 | Benasutti | 350/96.21 |
| 4,254,865 | 3/1981 | Pacey et al. | 350/96.21 |
| 4,257,674 | 3/1981 | Griffin et al. | 350/96.21 |
| 4,274,708 | 6/1981 | Cocito et al. | 350/96.21 |
| 4,339,172 | 7/1982 | Leather | 350/96.21 |
| 4,352,542 | 10/1982 | Tydings | 350/96.21 |
| 4,353,620 | 10/1982 | Schultz | 350/96.21 |
| 4,368,949 | 1/1983 | Schmidt | 350/96.21 |
| 4,391,478 | 7/1983 | Melman et al. | 350/96.20 |
| 4,435,038 | 3/1984 | Soes et al. | 350/96.21 |
| 4,458,984 | 7/1984 | Roberts et al. | 350/96.21 |
| 4,489,830 | 12/1984 | Charlebois et al. | 350/96.21 X |
| 4,585,303 | 4/1986 | Pinsard et al. | 350/96.20 |
| 4,593,971 | 6/1986 | Clement et al. | 350/96.20 |
| 4,602,845 | 7/1986 | Anderton | 350/96.20 |
| 4,634,216 | 1/1987 | Calevo et al. | 350/96.21 |
| 4,707,069 | 11/1987 | Hoffman, III | 350/96.21 |
| 4,712,863 | 12/1987 | Herg et al. | 350/96.21 |
| 4,725,118 | 2/1988 | Serrander | 350/96.20 |
| 4,729,619 | 3/1988 | Blomgren | 350/96.21 |
| 4,730,892 | 3/1988 | Anderson et al. | 350/96.21 |
| 4,740,411 | 4/1988 | Mitch | 350/96.21 X |
| 4,761,052 | 8/1988 | Buekers et al. | 350/96.20 |

FOREIGN PATENT DOCUMENTS

| | | | |
|---|---|---|---|
| 0065096 | 11/1982 | European Pat. Off. | 359/96.20 X |
| 52-19547 | 2/1977 | Japan | 350/96.21 X |
| 53-26142 | 3/1978 | Japan | 350/96.21 X |
| 58-9114 | 1/1983 | Japan | 350/96.20 X |
| 58-158621 | 9/1983 | Japan | 350/96.20 X |
| 1556476 | 11/1979 | United Kingdom | 350/96.21 X |

OTHER PUBLICATIONS

Tom Ormond, Technology News, EDN, Aug. 20, 1980, pp. 35, 36, 38, 40 and 41.
Larry Stauffer, Machine Design, Jan. 7, 1988, pp. 111, 112 and 113.

Primary Examiner—William L. Sikes
Assistant Examiner—Brian M. Healy

[57] ABSTRACT

A connector for making butt splices between a plurality of optical fibers in buffer tubes or cables. The connector comprises a plurality of splicing modules formed on a molded body with the modules arranged parallel and in a plane, arcuate or radial arrangement. Each module has a deformable metal splice and a separate cap for completing the butt splice of two ends of two optical fibers.

15 Claims, 3 Drawing Sheets

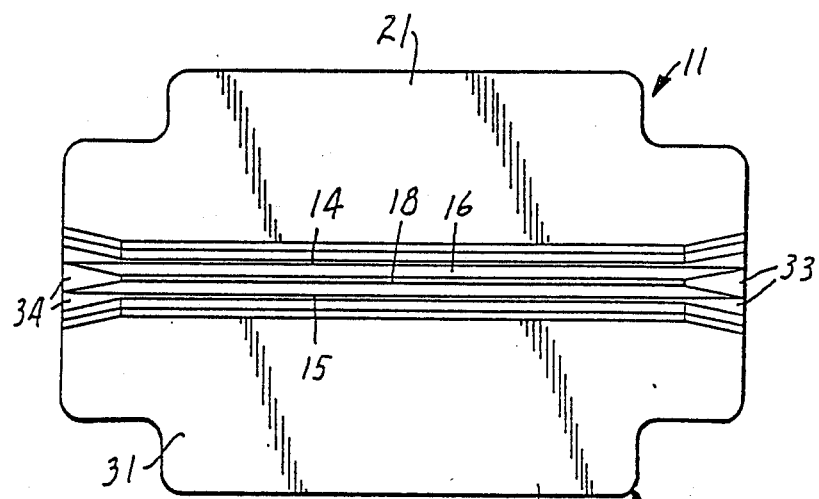
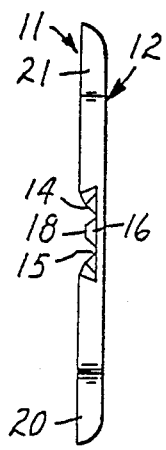
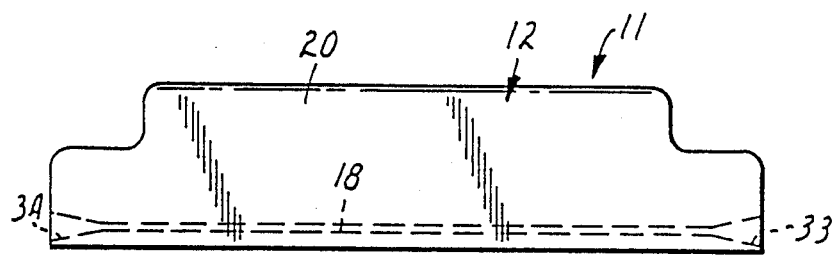
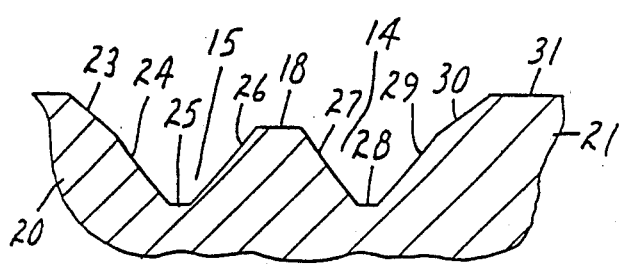
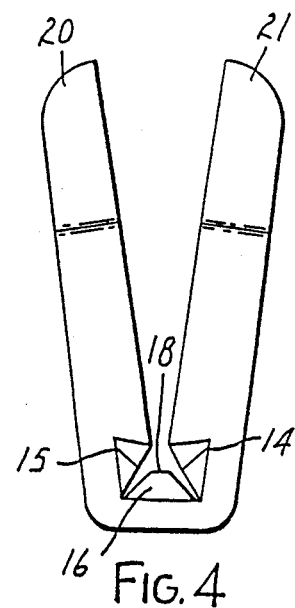

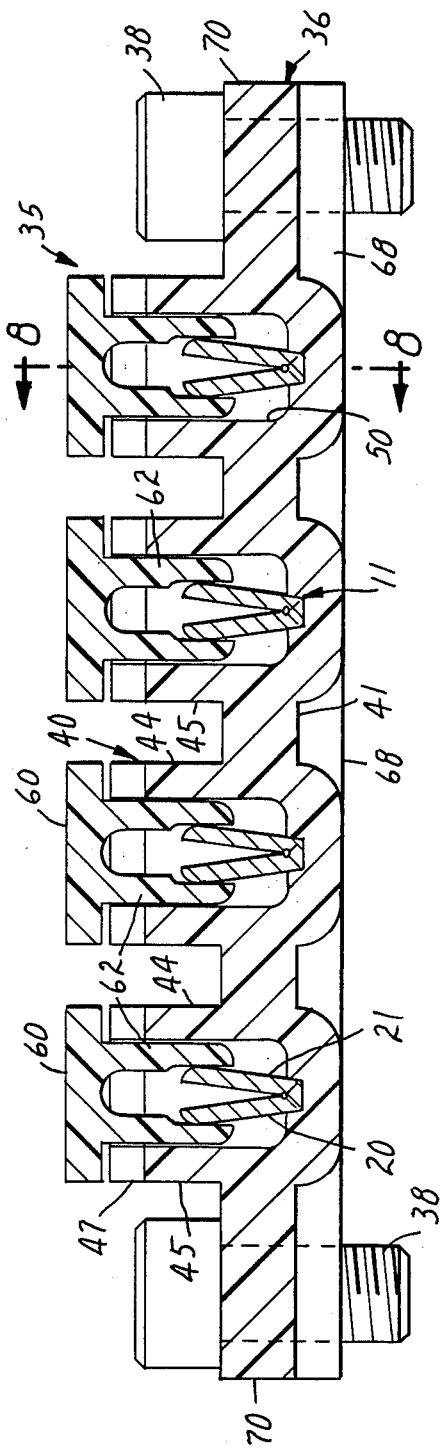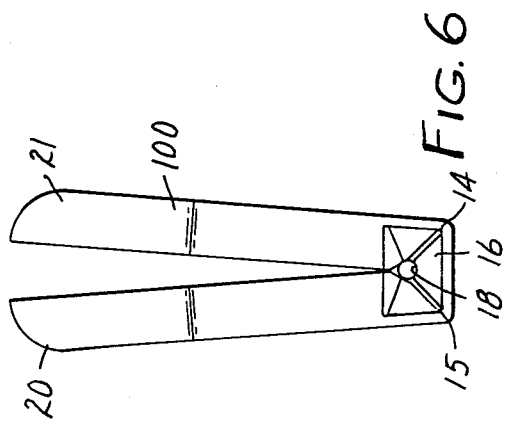

CONNECTOR FOR SPLICING OPTICAL FIBER CABLES

BACKGROUND OF THE INVENTION

1. Field of the Invention

This invention relates to optical fiber splicing devices for making multiple butt splices between optical fibers in buffer tubes or cables and in one aspect to an improved optical fiber connector for making splices between optical fibers with the splices being held together for convenience in organizing the splices.

2. Description of the Prior Art

The art is becoming replete with devices for centering optical fibers for the purpose of aligning ends of optical fibers for making butt splices between the ends of fibers for continued transmission of light rays along the fibers. The optical fiber used in the telecommunications industry is mostly a single mode glass fiber. This fiber typically contains a 8 $\mu m \pm 1$ $\mu m$ diameter central glass core through which the optical signal is transmitted. The core is surrounded by a glass cladding having a diameter of 125 $\mu m \pm 3$ $\mu m$. The cladding has a slightly different index of refraction than the core.

There are a number of prior art devices which have been designed to make permanent connections or splices in single mode glass fiber. These prior art devices are used to make the splice and then the splices are placed in a tray or held by bundling to attempt to organize the splices and the slack fiber.

Some of the prior are devices for making the butt splices attempt to achieve fiber end centering and alignment by forcing the fibers into a non-conformable "V" groove or between non-conformable rods. These devices function satisfactorily as long as the fibers being spliced are the same diameter. Other splicing devices use resiliently conformable material to achieve fiber centering. Examples of such devices are disclosed in U.S. Pat. Nos. 4,274,708; 4,729,619; 4,391,487; 4,435,038; and 4,593,971. Splices made with these types of devices are then placed in a splice holder of a splice tray as shown in U.S. Pat Nos. 4,373,776; 4,489,830; 4,500,166; and 4,679,896.

A butt splice apparatus for splicing a group of optical fibers is disclosed in U.S. Pat. No. 4,029,390. In this apparatus a plurality of optical fibers are spliced simultaneously. The fibers are adhesively bonded in individual non-conformable "V" grooves, then the ends are cut on a common plane. A folding of one half of the tray with one set of fibers onto the other half of the tray about a fold line perpendicular to the common plane places the fiber ends in abutting relationship. This apparatus makes all the splices simultaneously and permanently. However, for the apparatus to function properly and produce a low loss splice all of the optical fibers must be uniform in outside diameter and core position.

The connector of the present invention comprises a plurality of splicing modules each utilizing a splicing element to provide high precision fiber alignment and individual fiber splicing. The splicing is accomplished by the closing of the caps of the splicing modules to afford the splicing of the fibers in the deformable metal splice.

SUMMARY OF THE INVENTION

A connector for making multiple butt splices between optical fibers according to the present invention comprises a molded body having a plurality of splicing modules or sockets for receiving individual splicing elements for receiving and aligning the optical fibers. The multiple sockets are arranged parallel to each other in a plane, arcuate or circular array. The molded body may include means of fastening the body in a tray or on a housing to restrict the unwanted shifting of the connector and possible damage to the optical fibers.

The molded body has a plurality of generally rectangular sockets arranged thereon in parallel relationship, each socket having transversely spaced side walls, a bottom wall and opposite end walls defining a splicing element receiving cavity. The end walls have openings which communicate with the splicing element receiving cavity through which the optical fibers to be spliced are inserted.

A deformable metal splicing element comprises a rib having a first support surface for a fiber and a pair of levers having fiber supporting surfaces which levers are pivoted in relationship to said rib to force said supporting surfaces against optical fiber ends disposed therebetween and align their axes. The element comprises a folded sheet formed in one surface with two parallel grooves having converging walls which define, therebetween, a rib having a fiber supporting surface. The other walls of the grooves are separated at their base portions from the converging walls by land areas at which the sheet is folded. The other walls extend from the land areas at which the sheet is folded to the one surface of the sheet in which the grooves are formed and define two additional fiber supporting surfaces which together with the fiber supporting surface of the rib form a passageway for receiving an optical fiber. The sheet has edge portions which diverge from each other and extend past the passageway to define levers which are used to drive the fiber supporting surfaces together. These levers can be drawn toward each other to reduce the size of the passageway and bring the fiber supporting surfaces against circumferentially spaced areas of the optical fibers for aligning their axes. The levers are drawn together and held in the fiber clamping position by closing the cap onto the base.

The splicing element is preferably made of a material having an elastic yield strength sufficient to clamp the fiber supporting surfaces against a fiber and embed the fibers into the supporting surfaces. A preferred material is aluminum which is ductile having a hardness of between 23 and 32 Brinnell (BHN) scale and affords sufficient elasticity to maintain a continual compressive force on the optical fibers once the levers have been brought together.

Cap means are provided on each socket to urge the edge portions of the deformable metal splice element together to hold the same resiliently against the optical fibers. The squeezing of the levers is afforded by transversely spaced cam bars on the sides of the cap which receive the levers of the splicing element therebetween and bring the fiber supporting areas against the optical fiber or more generally against the cladding on the optical fiber with sufficient force that the three surfaces are deformed by the fiber. Should the two fibers differ in outside diameter the deformation of the surfaces may vary to accommodate the two sizes of fibers and align the axes of the two fibers.

BRIEF DESCRIPTION OF THE DRAWING

The present invention will be further described with reference to the accompanying drawing, wherein:

FIG. 1 is a plan view of the sheet forming the deformable metal splice element;

FIG. 2 is an end view of the sheet of FIG. 1;

FIG. 3 is a side view of the splice element of the present invention after the sheet has been folded;

FIG. 4 is an end view of the splice element ready to accept an optical fiber;

FIG. 5 is an enlarged fragmentary cross-sectional view of the sheet of FIG. 1;

FIG. 6 is an end view of a splice element with an optical fiber disposed in the closed element;

FIG. 7 is a vertical sectional view of the splice connector incorporating the deformable splice element of FIGS. 1 through 5;

DESCRIPTION OF THE PREFERRED EMBODIMENT

Figure 8:
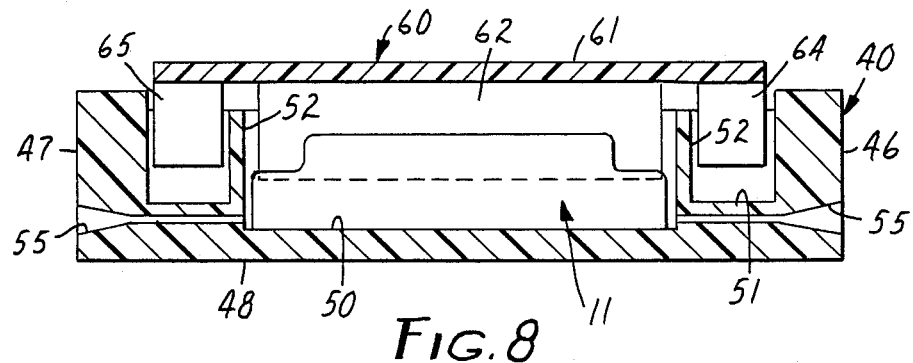
FIG. 8 is a cross sectional view of the connector of FIG. 7.

The present invention will be described by first describing the splicing element with reference to FIGS. 1 through 6 wherein the splice element, generally designated 11, is illustrated. The splice element 11 is designed for use in the optical fiber connector of the present invention. The splice element is formed from a sheet 12 of a deformable material. The sheet 12 has a pair of parallel grooves 14 and 15 formed generally centrally thereof which grooves define therebetween a rib 16 having an optical fiber supporting surface 18. The sheet 12 has edge portions 20 and 21 on either side of the grooves 14 and 15 which form levers that serve as means for drawing the fiber supporting surfaces on the sheet toward each other to align the axes of fibers positioned in a passageway defined by the supporting surface 18 and two additional surfaces by affording deforming compressive engagement therewith.

Referring now to FIG. 5 there is shown in enlarged scale the shape of the grooves 14 and 15. The sheet is stamped, coined or molded to provide preferably nine surfaces formed in the face or surface 31 of the sheet 12. The surface 23 is disposed at an angle of 55° to a vertical line or line perpendicular to the face of the sheet to form one optical fiber supporting surface, surface 24 is disposed at an angle of 42.5° to the vertical and together with surface 23 form one wall of the groove 15. The base of the groove 15 is defined by a land area 25 along which the sheet 12 is folded to form the pivot line for the side portion 20 to move surface 24 near a surface 26 forming a wall of the groove 15 and one side of the rib 16. The rib 16 has the surface 18 defining a support surface and the other wall or surface defining the rib is surface 27. The base of the groove 14 has a land area 28 joined to wall 27 and a first part or surface 29, corresponding to surface 24, and surface 30 corresponding to surface 23, forming the other wall of groove 14. Surfaces 26 and 27 are disposed at an angle of 42.5° to the vertical line. The surface 18 is recessed from the primary surface 31 of the sheet 12 sufficiently that when the sheet 12 is folded at the land areas 25 and 28 to dispose the side portions or levers 20 and 21 at 15° to 20° apart, the surfaces 23, 18 and 30 will be disposed to form a passageway to accept the desired sized fiber easily and engage the surface of a round fiber placed within the passageway at locations approximately 120° apart. This is generally illustrated in FIG. 6. Surfaces 18, 23, 24, 25, 26, 27, 28, 29, and 30 may also be curved slightly transversely about an axis instead of being planes but straight longitudinally. The only restriction on the surface geometry is that the 3 contact surfaces 23, 18, and 30 produce a channel with lines of contact spaced at approximately 120° internals around the circumference of the fiber to engage the fibers substantially uniformly along the length of the fiber ends disposed in the deformable splice.

The sheet 12 is provided with bevelled, flattened or flared surfaces 33 and 34 at opposite ends of the rib and walls defining the grooves 14 and 15. These flattened areas 33 and 34 define funnel like entrances or guides into the passageway defined by the surfaces 23, 18 and 30 of the splice element These surfaces 33 and 34 also afford means limiting the amount of bending on the fiber such that it cannot be bent more than 15° to 20° at the splice element after a splice is formed.

The sheet 12 is preferably formed of a metal, such as an aluminum sheet of 0.5 mm (0.020 inch) thick alloy 3003 with a temper of 0. The hardness of the material can be between 23 and 32 on the Brinnell scale (BHN) and the tensile yield strength can be between 35 to 115 MPa (Mega pascals) (5 to 17 ksi). Another alloy is 1100 with a temper of 0, H14 or H-15, together with a tensile yield strength and a hardness within the ranges. Both alloys provide a material which is softer than the glass of the optical fiber and the cladding but ductile under the clamping pressures applied to the optical fibers. Such deformation is sufficient that the surfaces 23, 18 and 30 conform to the optical fibers contacted and should one fiber be larger than another, the surfaces will deform sufficiently to clamp onto both fiber ends and be deformed even by the smallest of the two fibers. Thus, the splice element 11 will center the cores of the optical fibers such that the fibers are aligned with 90% or better of the surfaces of the fiber cores aligned. The material of the sheet 12 is also resilient such that the elastic limit of the material in the hinge areas and levers is not exceeded when the sheet is folded to contact a fiber therein. The elasticity of the material is such that the levers 20 and 21 will maintain a compressive force on the optical fiber after the splice is made to restrict the fibers from pulling out or the centers of the fibers from shifting from their position of alignment with each other. This continued spring compression also restricts changes in the performance of the deformable metal splice with changes in temperature. The reserve forces of this spring compression are always present when the splice has been completed.

The fibers are retained in the element such that the pull-out force will exceed the tensile strength of the glass fiber. The splice element 11 normally has a gel disposed in the area of the fiber receiving passageway which has index of refraction matching characteristics to improve the continuity of the transmission through the splice.

In a preferred example, the surface 18 has a width of 0.152 mm (0.0060 inch) and is recessed 0.109 mm (0.00433 inch) from the surface 31. From the center line through the rib 16 to the base of surfaces 26 or 27 is 0.317 mm (0.0125 inch), the width of surfaces 25 and 28 is 0.0838 mm (0.0033 inch). The distance from the center line through the rib 16 to the junction between surfaces 23 and 24 is 0.582 mm (0.0229 inch) and from the center line to the junction between surfaces 23 and 31 is 0.833 mm (0.0328 inch). The sheet 12 is normally 17.78 mm (0.7 inch) long by 7.62 mm (0.3 inch) wide along the major edges.

In tests, twenty sample elements were made using the geometry and dimensions defined above. Ten elements were made from 1100 series aluminum of 0 temper and ten samples were made in 1100 series aluminum of H15 temper. The same single mode fiber was used in making the splices in all sample elements. The average insertion loss for the H15 temper samples was approximately 0.10 db and for the 0 temper samples it was approximately 0.15 db. In thermal cycling tests where the elements formed of H15 temper were subjected to 78° C. for one hour, room temperature for one hour, one hour at −40° C., one hour back at room temperature, etc., all showed insertion loss variations to be less than 0.1 db over two weeks. The equipment used in the test was a Hewlett Packard Model 8154B 1300 μm LED source and a Hewlett Packard 8152A Optical Average Power Meter.

Referring now to FIGS. 7 and 8, there is illustrated a cable splice connector for forming butt splices between a plurality of optical fibers. The connector, generally designated 35, comprises a molded body 36 adapted to be removably mounted to a tray or frame by fastening members 38 extending through hole means in the molded body. The body member 36 is rectangular and comprises a plurality of spaced parallely positioned modules or oblong sockets 40 joined by webs 41. The sockets 40 each comprise side walls 44 and 45, and end walls 46 and 47, joined by a bottom wall 48. The side walls 44 and 45 are generally parallel and the end walls are positioned generally in a plane with the end walls of the other sockets. The walls of the sockets 40 are formed to define an elongate splice element receiving recess 50. The bottom of the recess 50 is shaped to receive the folded end of an element 11. A recess 51 is formed adjacent each end of the socket 40 and is separated from the recess 50 by a transverse septum 52. The end walls 46 and 47 are each provided with an optical fiber receiving opening 55 communicating with the recess 50. The openings 55 preferably have a countersink or flared end at the end wall to aid in inserting a fiber into the opening 55. The openings 55 extend beneath the recesses 51 as shown in FIG. 8. The recesses 51 cooperate to define detent means for retaining a cover 60 on each of said sockets 40.

The cover 60 comprises a top 61 which is as wide as the socket 40 and fits between the end walls 46 and 47 which project above the side walls 44 and 45. The top 61 has a pair of spaced parallel cam bars 62 depending from the inside surface of the top to fit within the side walls 44 and 45. The cam bars 62 are spaced from each other sufficiently to receive the levers of the splicing element 11 therebetween and to urge the same toward each other sufficiently to clamp a pair of fiber ends in the element, as described above. Detent means are provided to secure the cover 60 onto the socket in a first set position to retain the cover on the socket 40 and in a second closed position completing the splice. The detent means illustrated comprise a pair of spaced projections 64 and 65 positioned adjacent each end of the top 61 which fit into the recesses 51. The projections 64 and 65 each comprise two spaced panels, each having an interference fit with side walls 44 and 45, respectively and the walls and panels are provided with opposed detents, recesses, shoulders, or the like to mechanically retain, permanently or removably, the cover 60 in place on the socket. Each socket 40 has a separate cover 60 as described to individually make the butt splices between the optical fibers.

A supporting rib 68 is provided on one side of the molded body 36. The rib 68 strengthens the body and extends around the openings through mounting flanges 70 for the fasteners 38 to form a reinforcing boss. The rib can extend along each edge of the body 36 and connect to bosses around each of four openings for fasteners 38. The openings are formed in mounting flanges 70 extending beyond the end sockets 40 of the plurality of sockets.

The actual number of sockets 40 on a housing 36 will depend on the application of the connector.

Figure 9:
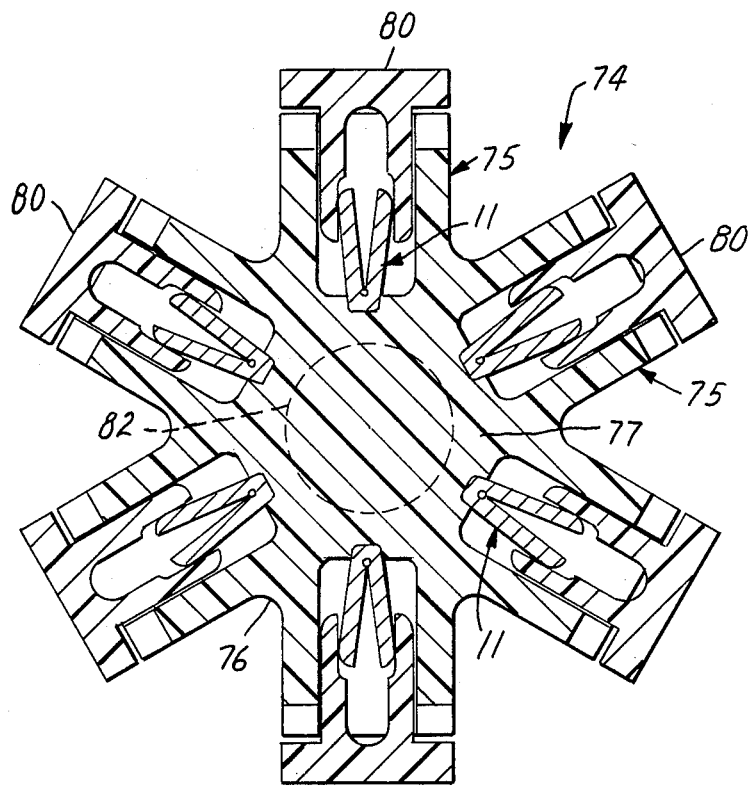
FIG. 9 is a vertical sectional view of a second embodiment of a splice connector constructed according to the present invention.

The connector 74 illustrated in FIG. 9 corresponds generally to the connector of FIGS. 7 and 8, with the basic difference being the sockets, illustrated generally as 75, are positioned on a support 76 in a radial array. The sockets 75 extend parallel to a common axis and the longitudinal axes of the sockets are parallel. The support 76 is molded to form a hub 77 around which a plurality of sockets 75 are positioned. The walls of the sockets are formed integrally with the hub. A splice element 11 is positioned in a recess in the socket 75 and a cover 80 is positioned above each recess to clamp the splice element onto the ends of optical fibers threaded into the openings at the ends of the sockets. The covers 80 are similar to the covers 60 and include the bars for closing the splicing element onto the fibers and the detent means for securing the cover to the socket.

The connector 74 can be divided diametrically or along two radii or along a chord to reduce the number of modules or sockets 75 on the connector. Thus the remaining modules are arranged in an arcuate array of two, three, etc sockets.

The hub 77 is provided with a recessed area 82 to reduce the material in the hub. This recess may also support the connector 74 on a rod or be provided with a fastener through a center axially extending hole which splices the strength members of the buffer tubes or cables spliced.

The sockets 40 and 75 can be constructed to have inserts which fit into openings in the end walls of the sockets for the purpose of forming the openings through which the fibers are guided into the deformable metal splicing element and to retain the splicing element 11 in place. Such a structure is illustrated in copending application Serial Number (attorney docket number 43033USA4A) assigned to the assignee of this application and incorporated herein by reference.

The body member including the sockets and the caps are preferably molded from a glass loaded polymeric formulation identified as Vectra A 130 available from Engineering Plastics Division of Hoechst Celanese Corporation of Chatham, N.J., U.S.A. This material has a high heat deflection temperature and will not cold low under the pressures applied by the levers 20 and 21.

The connectors of this invention provide a connector for use in connecting the optical fibers of a buffer tube or of a cable and readily organizes the splices.

Having described the present invention with reference to several embodiments of the present invention it is to be appreciated that modifications can be made in specific materials, shape and other features without departing from the spirit and scope of the present invention as set out in the appended claims.

I claim:

1. A connector for making multiple butt splices between optical fibers comprising a molded body having a plurality of splicing modules supported thereon, said modules being generally rectangular and arranged generally parallel to each other, said modules comprising:

transversely spaced side walls, a bottom wall and opposite end walls defining a splicing element receiving cavity, said end walls having openings which communicate with said splicing element receiving cavity through which optical fibers to be spliced are inserted, a splicing element inserted in said cavity and comprising central rib means having a first elongate fiber supporting surface and a pair of lever means pivoted about opposite edges of said rib means and diverging therefrom, said lever means having an elongate fiber supporting surface positioned adjacent said first fiber supporting surface to form a passageway for an optical fiber and for engaging a said fiber at spaced positions around said fiber, said lever means being initially disposed to diverge from said rib means and being formed for movement toward each other to grasp a said optical fiber therebetween and splice ends of two fibers in aligned position, and a cap having a wall to cover said cavity and transversely spaced depending cam bars on one surface of said wall to receive the diverging lever means of said element therebetween and spaced to fit within said cavity between said side walls whereby movement of said cap into said cavity will urge said lever means to pivot about said rib means bringing said supporting surfaces against a said optical fiber and align the abutting ends thereof in the passageway and retain said fiber ends in aligned abutting relationship.

2. A connector according to claim 1 wherein said molded body comprises means for fastening said molded body to a frame.

3. A connector according to claim 1 wherein said splicing element is a deformable metal splicing element.

4. A connector according to claim 1 wherein said modules are arranged generally planar with side walls parallel and end walls disposed is substantially the same plane.

5. A connector according to claim 1 wherein said modules are arranged in an arcuate array.

6. A connector according to claim 1 wherein said modules are arranged in a radial array.

7. A connector according to claim 1 wherein said splicing element comprises a thin sheet of deformable material having opposite surfaces and longitudinal sides, a pair of parallel grooves formed in one surface, two of the walls defining said grooves form said rib means which has equal converging sides and a narrow first fiber supporting surface therebetween, the other two side walls forming the grooves are separated at third base portions from said two of the walls by land areas at which said sheet is folded, and said other two side walls extend from said land areas to said one surface of said sheet and include surface areas defining said elongate fiber supporting surfaces carried by said lever means which elongate supporting surfaces are disposed in an angular relationship to each other and with said first fiber supporting surface of said rib means which surfaces collectively define said fiber receiving passageway, and the sides of said sheet parallel to said grooves form said diverging lever means which serve to draw said supporting surfaces toward one another upon movement of said lever means toward one another to engage said fiber ends and clamp them in axially aligned position.

8. A connector according to claim 7 wherein said sheet is formed of a material having sufficient elastic yield strength to permit the diverging lever means to clamp said supporting surfaces against a said fiber to embed a said fiber into said fiber supporting surfaces.

9. A connector according to claim 7 wherein said material is metal.

10. A connector according to claim 9 wherein said sheet is formed of an aluminum alloy having an elastic yield strength of between 35 and 115 MPa.

11. A connector according to claim 8 wherein said sheet is formed of aluminum and the sheet is about 0.57 mm thick.

12. A connector according to claim 11 wherein said aluminum sheet is aluminum alloy 3003.

13. A connector according to claim 12 wherein said aluminum has a 0 temper.

14. A splice element according to claim 11 wherein said aluminum is alloy 1100 having a 0 temper.

15. A splice element according to claim 11 wherein said aluminum is alloy 1100 having a temper of about H14 and H15 and an elastic yield strength of between 35 and 115 MPa.

* * * * *